(No Model.) 6 Sheets—Sheet 1.
W. R. CUNNINGHAM.
BRICK OR TILE CUTTING MACHINE.
No. 573,263. Patented Dec. 15, 1896.
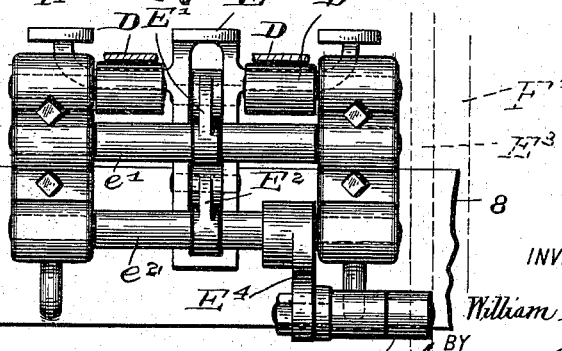
WITNESSES:
INVENTOR
William R. Cunningham,
BY
Chester Bradford,
ATTORNEY.

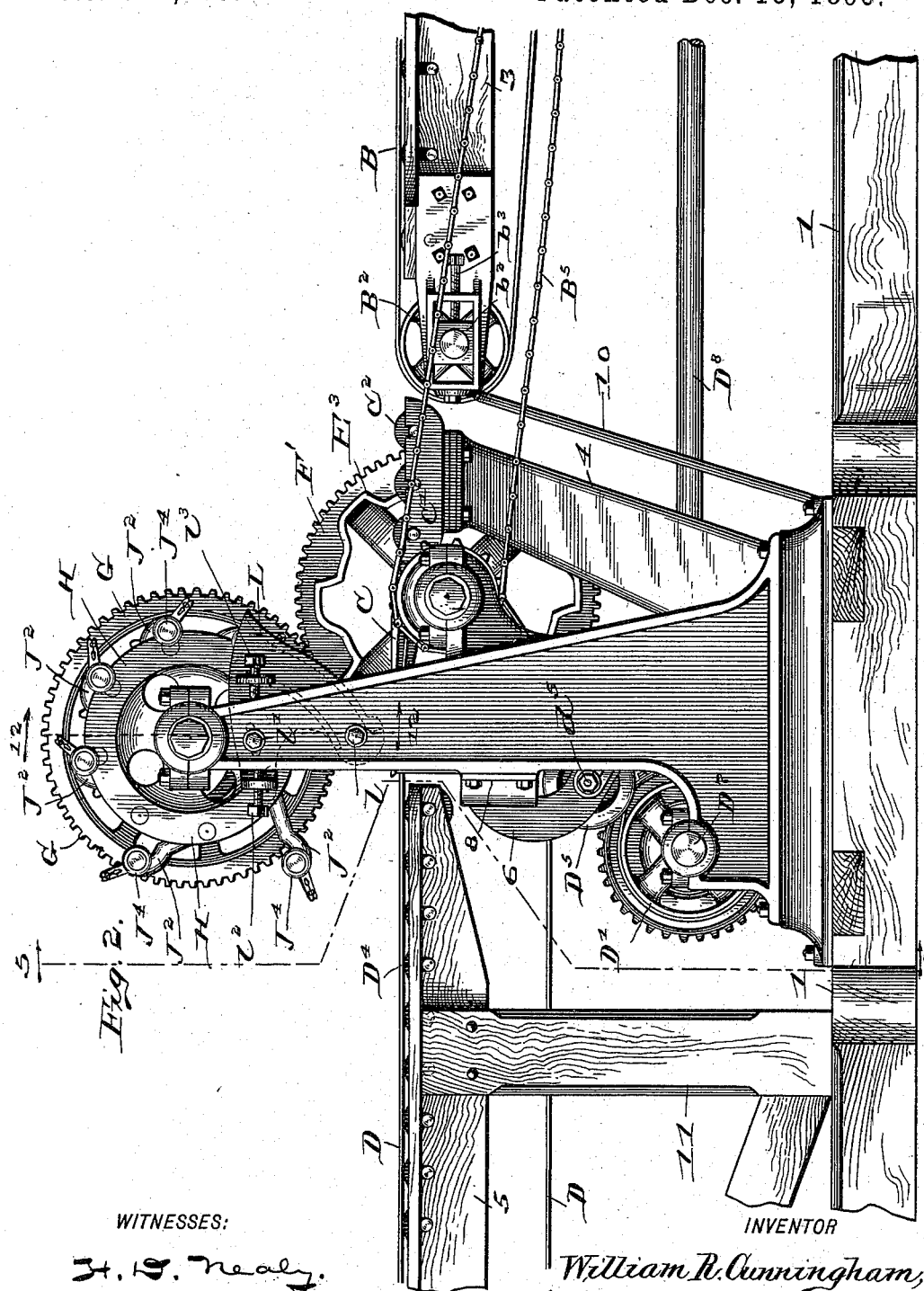

(No Model.)     6 Sheets—Sheet 3.
W. R. CUNNINGHAM.
BRICK OR TILE CUTTING MACHINE.
No. 573,263.     Patented Dec. 15, 1896.
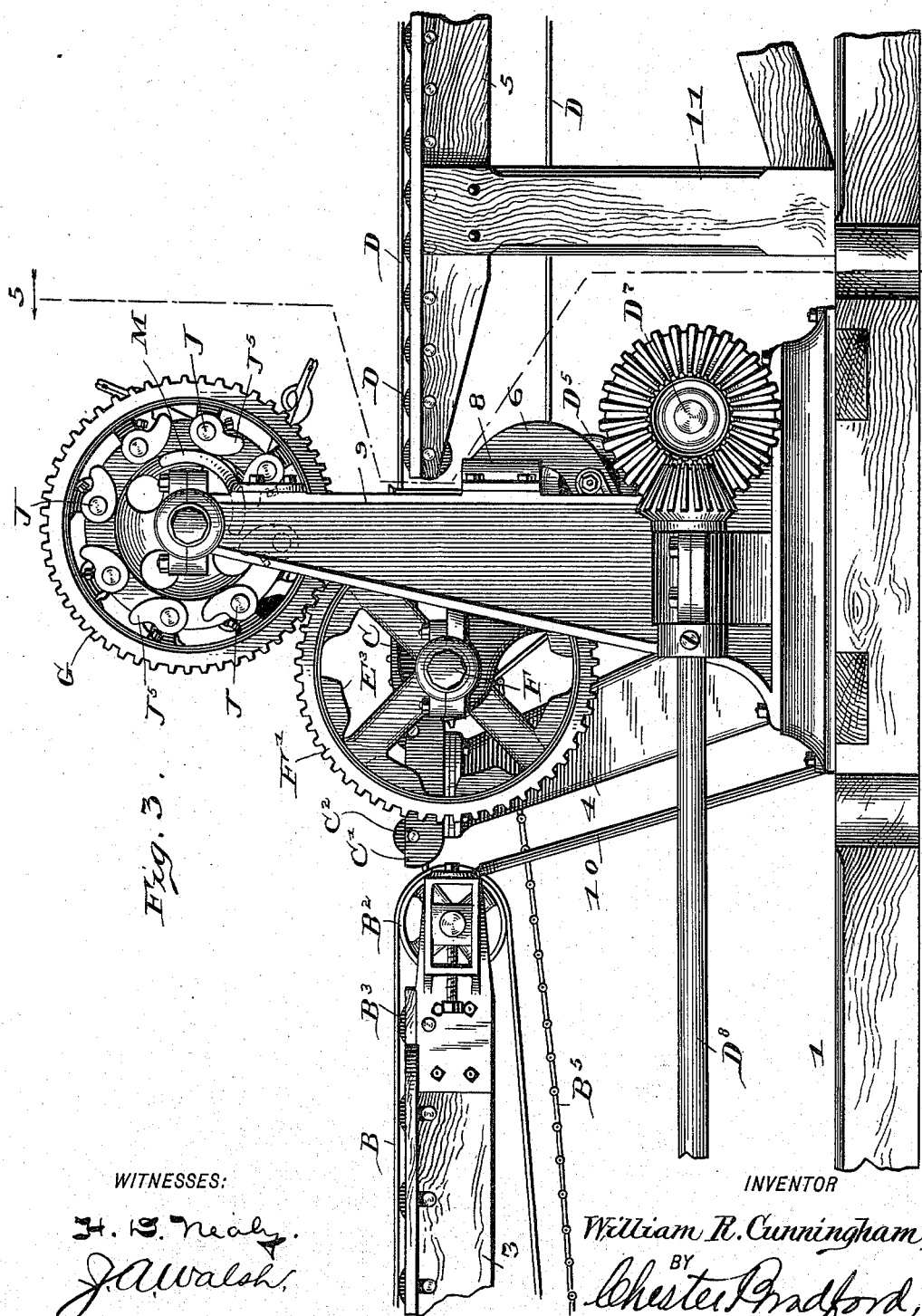
WITNESSES:
INVENTOR
William R. Cunningham,
BY
Chester Bradford,
ATTORNEY.

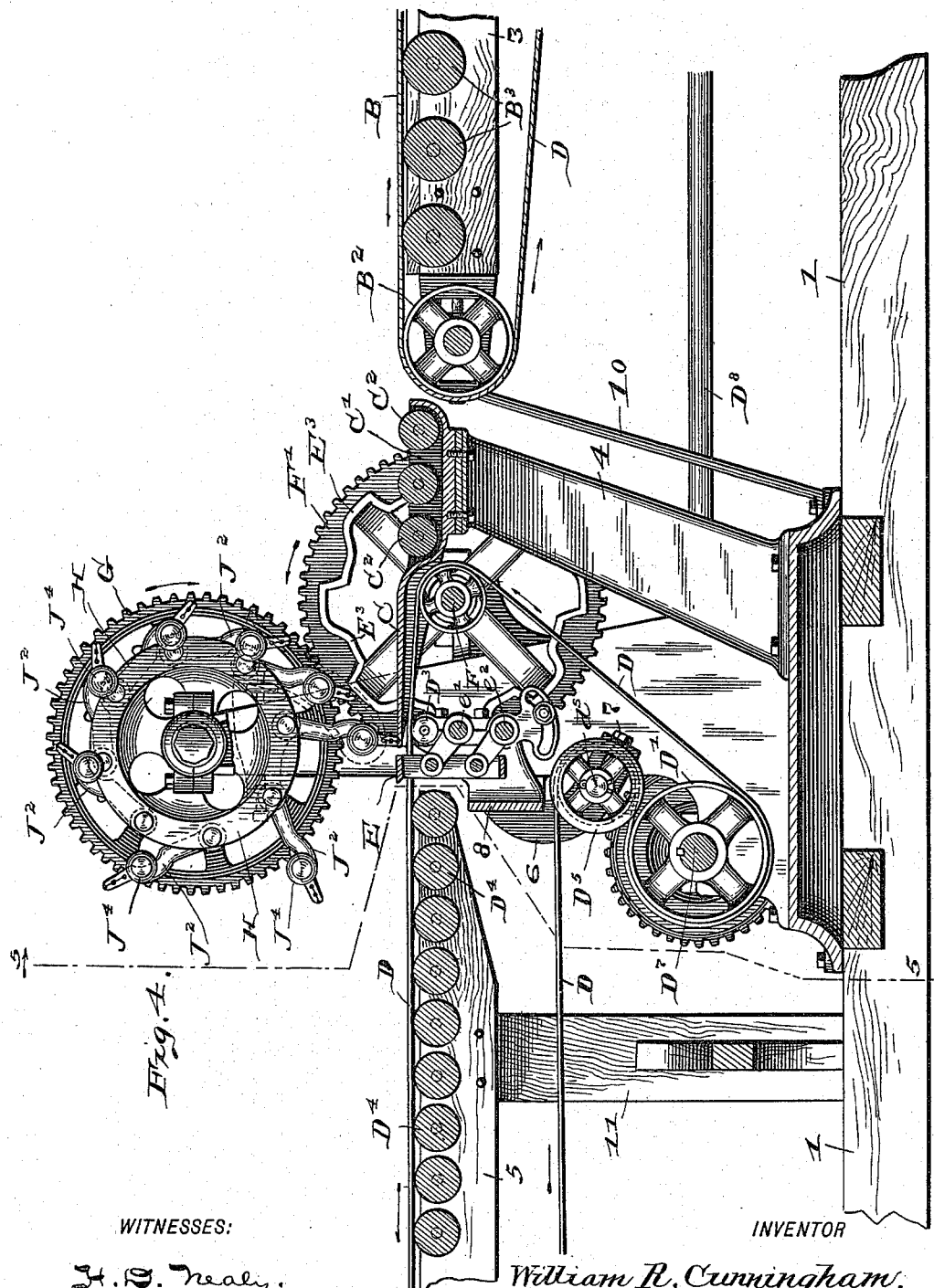

(No Model.) 6 Sheets—Sheet 5.
W. R. CUNNINGHAM.
BRICK OR TILE CUTTING MACHINE.
No. 573,263. Patented Dec. 15, 1896.
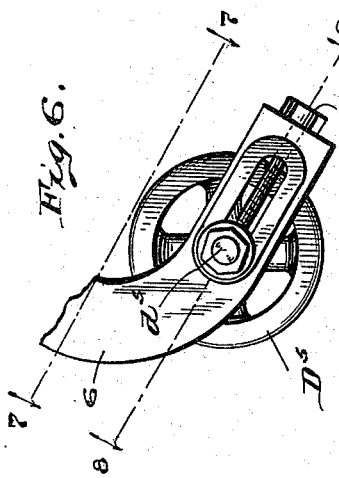
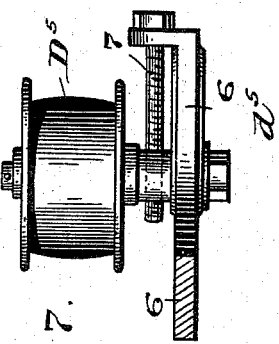
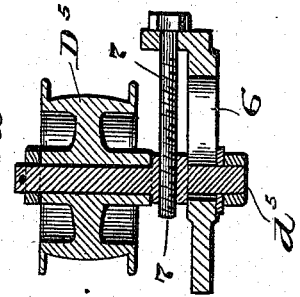
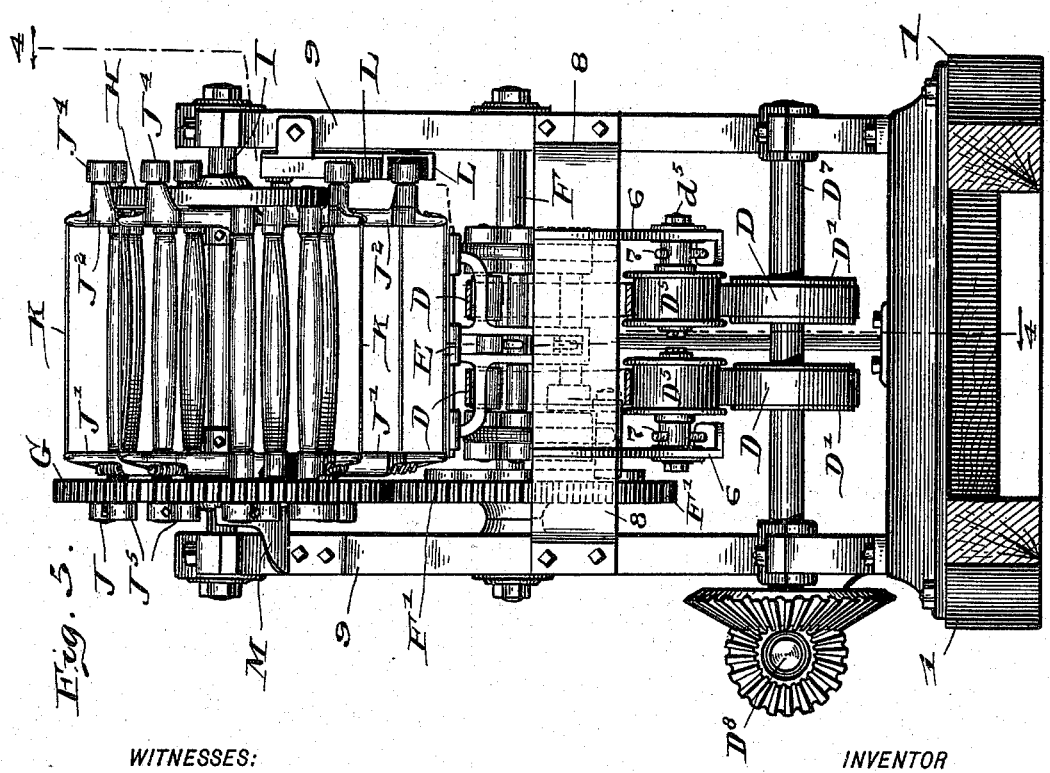
WITNESSES: INVENTOR
William R. Cunningham,
BY Chester Bradford,
ATTORNEY.

(No Model.) 6 Sheets—Sheet 6.
W. R. CUNNINGHAM.
BRICK OR TILE CUTTING MACHINE.
No. 573,263. Patented Dec. 15, 1896.
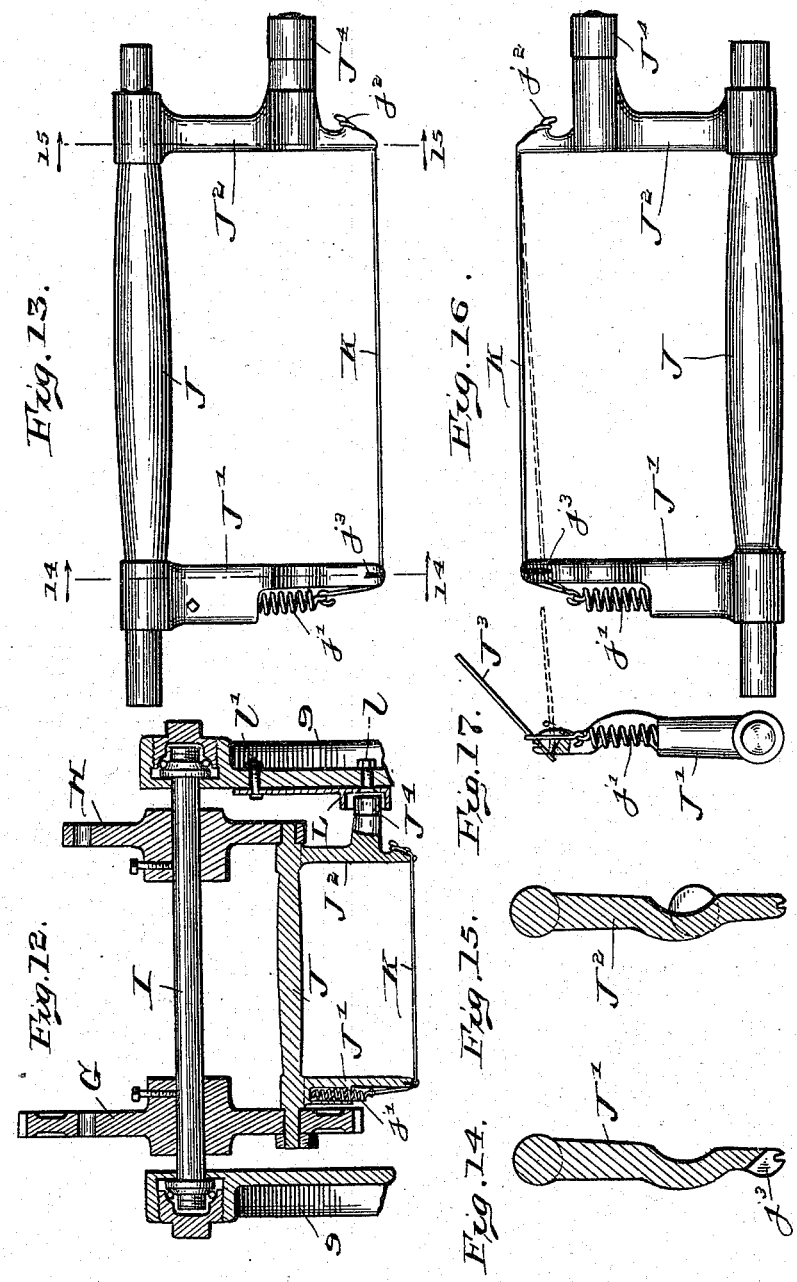
WITNESSES: INVENTOR
William R. Cunningham,
Chester Bradford,
ATTORNEY.

United States Patent Office.

WILLIAM R. CUNNINGHAM, OF FRANKFORT, INDIANA, ASSIGNOR TO THE WALLACE MANUFACTURING COMPANY, OF SAME PLACE.

BRICK OR TILE CUTTING MACHINE.

SPECIFICATION forming part of Letters Patent No. 573,263, dated December 15, 1896.

Application filed August 19, 1895. Serial No. 559,766. (No model.)

*To all whom it may concern:*

Be it known that I, WILLIAM R. CUNNINGHAM, a citizen of the United States, residing at Frankfort, in the county of Clinton and State of Indiana, have invented certain new and useful Improvements in Brick or Tile Cutting Machines, of which the following is a specification.

My present invention consists in certain respects in certain improvements upon that shown and described in Letters Patent of the United States No. 459,719, dated September 15, 1891, and in other respects in some devices which I believe to be entirely novel for the purpose.

As a whole my present invention comprises a substantially newly-organized machine, which is especially adapted to the work of producing what are known as "side-cut" bricks, while that shown in my former patent was especially adapted to produce what are known as "end-cut" bricks.

There are several advantages appertaining to the manufacture of side-cut bricks over any that can be secured in the manufacture of end-cut bricks. The column of clay issuing from the die of the brick-machine is of a larger diameter, (having four times the cross-sectional area,) and consequently is less liable to contain laminations, so that the resulting bricks are more homogeneous. The sides of the column of clay formed by contact with the die of the brick-machine are smooth, and these smooth sides are preserved for the exterior faces of the brick when in use, while the rougher or cut sides receive the mortar; while in end-cut bricks, on the contrary, the ends (which frequently are exposed in the building of brick walls) are cut, and consequently more or less rough. The speed at which the clay must issue from the machine to produce a given quantity of bricks must be four times as great where end-cut bricks are being made as where side-cut bricks are being made, bricks being commonly eight inches in length and two inches in thickness.

I will now first describe in detail a machine embodying my various improvements in the best form with which I am at present acquainted, after which such improvements will be specifically pointed out in the claims.

Referring to the accompanying drawings, which are made a part hereof, and on which similar letters and numerals of reference indicate similar parts, Figure 1 is a perspective view of a machine embodying my present invention; Fig. 2, a side elevation of the central portion thereof, on an enlarged scale, from the same side illustrated in Fig. 1; Fig. 3, a similar side elevation of the opposite side; Fig. 4, a view, partly in elevation and partly in section, as seen from the dotted line 4 4 in Fig. 5; Fig. 5, a transverse sectional view as seen from the dotted lines 5 5 in Figs. 2, 3, and 4; Figs. 6, 7, and 8, detail views illustrating the construction and means of operating the belt-tightening pulleys for the off-bearing belts; Fig. 9, a fragmentary sectional view, on a still further enlarged scale, similar to a portion of Fig. 4; Fig. 10, a view similar to Fig. 9, except that the "primary brick-support" is in its secondary position; Fig. 11, an elevation of said primary brick-support with the operating-wheel and adjacent parts removed, or shown only in dotted lines, as seen from the dotted line 11 11 in Fig. 9; Fig. 12, a detail sectional view, omitting all parts not on the section-line, on the dotted line 12 12 in Fig. 2; Fig. 13, a detail side elevation, on an enlarged scale, of one of the cutter structures; Figs. 14 and 15, detail sectional views through the arms of the cutter structure, respectively on the dotted lines 14 14 and 15 15 in Fig. 13; Fig. 16, a side elevation of the other side of the cutter structure illustrated by Fig. 13; and Fig. 17, an end elevation of Fig. 16, illustrating particularly my preferred means of placing the cutter-wires in position.

In said drawings the portions marked A represent the column of clay issuing from a brick-machine and from which the bricks are to be cut; B, the belt which receives said column of clay and through which the mechanism of the machine is driven therefrom; C, the cutting-table; D, the off-bearing belt; E, a support for the brick while being cut from the column, which I have denominated a "primary brick-support;" F, the main driving-shaft of the mechanism; G, a combined spur-gear and disk forming part of the reel carrying the cutters; H, the other disk of said reel; I, the shaft of said reel; J, the cutter structures; K, the cutter-wires; L, the cam-guideway whereby the cutter-wires are caused to pass in the proper direction through the column of clay, and M the cam projection on the other end of the frame by which the cutter structures are raised from the final cutting position.

The numerals 1, 2, &c., indicate various members of the frame structure.

As in the machine described in my above-mentioned Letters Patent, the column of clay from which the bricks are to be cut as it issues from the brick-machine furnishes the power by which the cutting mechanism is driven, so that uniformity of size is invariably secured, the speed of the cutter being manifestly timed exactly by the speed of the column of clay. I have, however, devised a new method of applying this power, by which not only greater certainty of uniform movement is secured, but also a means of adjusting the machine to produce any required thickness of brick. The column of clay A is delivered onto the belt B from the brick-machine and runs over and drives said belt, as shown. Said belt is carried by the pulleys B' and B² and the series of intermediate idle-rolls B³. Said pulley B' is carried by adjustable bearings on the frame end 2, the pulley B² being carried by adjustable bearings on the inner ends of the frame members 3, and said rolls B³ being carried in ordinary bearings in said frame members, as shown. On the end of the shaft $b$ is a sprocket-wheel B⁴, over which runs a chain belt B⁵, by which the cutting mechanism is driven, as will be presently described.

In order to vary the speed of the cutting mechanism, and consequently the thickness of the bricks to be produced, it is only necessary to change the pulley B', substituting a pulley of a different size, and properly readjust the bearings carrying the shaft $b$, or substitute a different-sized sprocket-wheel for the sprocket-wheel B⁴, in either of which cases the mechanism will run at a different but still uniform speed—that is, uniform relatively to the speed of the column of clay—thus severing bricks from the column of clay with greater or less rapidity and producing bricks of less or greater thickness. An ordinary tension device $b^5$ for the belt B⁵ is shown in Fig. 1, the operation of which will be readily understood, it being in effect merely an ordinary adjustable tightening-pulley carried by an adjustable lever, as shown. The tension of the belt B may be regulated by moving the pulley B² by means of the adjustable bearings $b^2$ and the adjusting-screws $b^3$.

Upon the standard 4 of the frame is the rigid cutting-table C, which includes a lubricant-pan C', in which run lubricating-rollers C², over which the column of clay passes on its way to the cutting-point and by which the under side of said column is slightly lubricated, as in my former machine, the construction, however, being somewhat different and improved. The table C reaches just to that point where the cutting is completed, whereby bricks are severed from the column of clay.

One great difficulty in producing side-cut bricks has been to provide some means by which they should remain in undisturbed position after the cutting operation has been completed, as if such bricks are tipped from their original position before opportunity has been afforded for them to dry and harden they are likely to become distorted in form or the corners destroyed. It is therefore of the highest importance that bricks of the character formed by this machine should be maintained in the position in which they are cut, and to this end it is important that the off-bearing belt should pass directly below the cutting-point and that the movement of each brick from the instant of cutting, as it descends onto the belt, should be such that the sides of the brick are maintained in vertical planes without tipping or twisting, while at the same time the movement should be sufficiently forward to part the brick from the advancing column of clay. These features are best shown in Figs. 4, 9, and 10. The off-bearing belt D, I prefer to make duplex, or as two narrow belts, as shown, and which are driven by pulleys D', passing thence over idle-pulleys D² and small idle-rolls D³ to the series of idle-rolls D⁴, the latter of which correspond to the idle-rolls B³ and are mounted in bearings in the frame members 5. While the idle-pulley D² might have a separate mounting, I mount it, for convenience, on the shaft F, which is driven from the chain belt B⁵. In passing to the driving-pulley D' this belt D passes over adjustable idle-pulleys D⁵ (which will presently be more fully described) and at the outer end over other suitable idle-pulleys D⁶, mounted in bearings on the outer ends of the frame members 5, as shown in Fig. 1.

By the means described it will be seen that the off-bearing belt D is caused to pass directly beneath the cutting-point, so that its upper surface (which receives the brick) is on a perfect level at the point where it receives said brick, although, as shown, it is positioned a little lower than said cutting-point. As stated, the belt D is preferably a duplex belt, and consequently the adjusting idle-pulleys D⁵ are separately mounted and adjustable. The construction and means of adjusting these pulleys are best shown in Figs. 6, 7, and 8, Fig. 6 being substantially the same, on a larger scale, as a fragment of Fig. 4, and Figs. 7 and 8 sectional views, as indicated by the dotted lines 7 7 and 8 8 in Fig. 6, respectively. Said adjusting-pulleys D⁵ are flanged pulleys mounted on the adjustable stud-shafts $d^5$, mounted in slots in the frame member 6, and are respectively separately adjusted to the desired position by the adjusting-bolts 7, all as shown in the figures referred to. The shaft D⁷, carrying the pulleys D', is shown as driven by the driving-shaft D⁸ through suitable bevel-gears.

The primary brick-support E is best shown in Figs. 4, 9, 10, and 11. Its brick-carrying surface, as best shown in Fig. 11, is preferably divided into three parts, between which the members of the duplex off-bearing belt D run, so as to afford a support upon both sides of each of the members of said belt. It is carried by parallel arms E' and E², so that its upper surface remains continually horizontal, while at the same time its movement is in substantially an arc of a circle, so that as it descends it also moves forward, carrying the newly-severed brick away from the column of clay which is following. Its position during the time while the brick is being severed is shown in Fig. 9, and its lowermost position after the brick has been severed and deposited is shown in Fig. 10. It descends by gravity, but is raised by the cam-flange E³ on the wheel F'. The arms E' and E² are carried on rock-shafts e' and e², which are mounted in bearings in the frame member 8, and upon said rock-shaft e² is also mounted the operating-arm E⁴, and the two arms E² and E⁴ serve as a lever (with the rock-shaft e² as the fulcrum) to raise the primary brick-support E from time to time. Secured to this arm E⁴ is an antifriction-truck e⁴, which extends out into the path of the cam-flange E³ on the wheel F'. I have shown this arm E⁴ as having a segmental slot within which to secure the stud-shaft carrying the antifriction-roller e⁴, and which forms a means of adjustment therefor, so that the primary brick-support can be easily and accurately adjusted to rise to exactly the level of the cutting-table C and readjusted from time to time, as may become necessary, because of wear or otherwise. The parts being properly adjusted and timed, the operation is, as the wheel F' revolves, that said wheel continually, through its flange E³, raises the primary brick-support E to position and permits it to fall or descend, thus first supporting the brick while it is being cut from the column of clay and then depositing it upon the off-bearing belt D. The forward movement caused by the swing of the arms E' and E² is sufficient to carry the brick out of contact with the advancing column of clay as said brick is deposited onto the off-bearing belt, and said off-bearing belt is timed to run at a somewhat greater speed than the column of clay, so that the bricks are separated one from another as they are carried away from the cutting-point, as is clearly illustrated in Fig. 1 of the drawings. The space between the upper surface of the primary brick-support E and the forward edge of the table C when the former is in its raised position is inconsiderable, as shown, so that there is a firm support upon both sides of the cutter as it descends until the brick is completely severed, the space being little more than sufficient to permit the passage of the cutter-wire.

The shaft F is positively driven by the chain belt B⁵, and as said belt receives its motion from the column of clay of course the speed of said shaft also always bears a uniform and predetermined relation to that of said clay column. Fixedly mounted upon this shaft is the spur gear-wheel F', which also has the cam-flange E³, which operates the primary brick-support E, as has just been described. Its toothed edge meshes into and drives a corresponding spur gear-wheel G, mounted on the shaft I, which latter is mounted in bearings at the upper ends of the frame members 9, as shown in Fig. 12.

The spur gear-wheel G and disk H are both fixedly mounted upon the shaft I, and said parts G, H, and I together form a revolving reel, in which are mounted the cutter devices, as shown in elevation in Fig. 5, but more clearly shown in dead-section in Fig. 12. These cutting devices consist, primarily, of the U-shaped structures consisting of the rock-shaft J and arms J' and J², said rock-shaft being loosely mounted in the disks G and H, and the cutter-wires K, attached to the outer ends of said arms. I prefer to make the structure J J' J² a single casting, as shown most plainly in Fig. 12, although of course it may be composed of separate parts, if desired. However composed, these structures are free to rock in their bearings, except as controlled by the cams, which will presently be described. The reel structure G H I, which carries them, is in continuous rotation while the machine is in operation.

The wires K are provided with a peculiar means of attachment, which is best illustrated in Figs. 16 and 17. On the arm J' is a spring j', and on the arm J² is a hook j². Both arms are slitted at the end somewhat to form bearings for the wire when in place. The arm J' is also slitted transversely and more deeply, as indicated more plainly in Figs. 14, 16, and 17, the preferred form of this slit j³ being best shown in Fig. 14. The wires K being cut to the proper length and looped or hooked at the ends, as shown, one end is hooked over the hook j² and the other brought across, as indicated by the dotted lines in Fig. 16, and hooked into the spring j'. By means of a small lever J³, inserted through the slit j³, the wire is then lifted up, as indicated in Fig. 17, and deposited in the bearing-slit formed to receive it. This operation is a very expeditious one, and by having a number of wires prepared if one becomes accidentally broken it is only a momentary work to replace it with a new one. The springs j' being of the proper tension the cutting-wires are always held firmly but yieldingly to position, so that if they come in contact with small stones or other hard substances they may yield somewhat. I thus secure a rigid cutter-frame structure with a yielding cutter-wire and a means of easily placing and replacing such cutter-wire.

The positions which the various cutter-frames assume as the work of cutting progresses are best illustrated in Figs. 4, 2, and 3. As indicated most plainly in the upper and upper right-hand portions of Fig. 4, the arms lie over onto one another after they are freed from the operation of the cams, as will be presently described. As shown most plainly in Figs. 13, 14, and 15, these arms are curved or cut away somewhat to permit the proper positions relative to each other at this point; and this cutting away, as especially indicated in Figs. 13 and 15, extends substantially one-half across the stud-shafts carrying the antifriction-rolls by which the cutter is guided during the period of the cutting.

The stud-shafts above referred to may be formed integral with the arms $J^2$, as shown most plainly in Figs. 12, 13, and 16, and preferably carry on their outer ends antifriction-trucks $J^4$, and these, as shown most plainly in Figs. 2 and 12, enter the cam-guideway L, secured to the adjacent upright frame member 9. As indicated most plainly by the dotted lines in Fig. 2, the course of this cam-guideway is such that as the cutter being operated upon descends said cutter advances with the same speed as the column of clay being operated upon, so that the movement of the cutter-wire through the clay is directly at right angles with the column. This cam-guideway L is mounted at the bottom on a pivot-bolt $l$, which secures that the bottom shall always be held at the same point. At the upper end it is secured by the tie-bolt $l'$ (passing through an elongated hole) and the adjustable stay-bolts $l^2$ $l^3$, so that its upper end may be adjusted as desired, according to the speed of the column of clay and the thickness of the bricks desired.

In order that the cutters shall be raised out of the way as soon as the cutting operation is completed, and also that they shall be thrown over to the position spoken of, as shown at the upper portion of Fig. 4, ready for a succeeding operation, I have provided on the upper ends of the rock-shafts J cam-arms $J^5$ and have attached a corresponding cam projection M to the corresponding frame member 9. The lower end of said cam M is positioned so that the end of the cam-arm on each cutter device will contact with it as soon as the cutting operation is finished, and it extends in a curved direction upward around the axis of the reel and gradually away from said axis to a point somewhat above it, so that each shaft is continuously turned from the time of contact between said arm and cam until the reel has revolved to a point where the cutter devices will fall over to the other side of their pivots of their own weight. The consequence is that as soon as the cutting operation is completed the cutting-wire is lifted immediately out of the way of the brick which has been cut, and the lifting process continues until the cutter structure falls over by its own gravity into the position indicated, where it remains until the roller $J^4$ on the arm $J^2$ again comes in contact with the cam-guide L, when the wire is guided to cut another brick, as before, and these operations are continuously repeated.

Having thus fully described my said invention, what I claim as new, and desire to secure by Letters Patent, is—

1. The combination, with the cutting mechanism of a brick or tile cutting machine, of a feeding-belt terminating before reaching the cutting mechanism, a separate off-bearing belt running in a substantially level position below and to behind the cutting-point, whereby the bricks, as they are successively cut and dropped, will be deposited directly onto the level surface of said belt.

2. The combination, with the cutting mechanism of a brick or tile cutting machine, of a cutting-table, and a vertically-moving, primary brick-support carried by parallel swinging arms, and an off-bearing belt running beneath said primary brick-support, whereby the brick is supported at the level of the cutting-table while being cut, and is thence carried by said primary brick-support onto the off-bearing belt while still maintaining its upright position.

3. The combination, in a brick or tile cutting machine, of a revolving reel carrying the cutter structures, said cutter structures carried by rock-shafts, cam-arms on the ends of said rock-shafts, and a cam-flange secured to an adjacent point of the framework and extending from a point below the axis of said reel to a point at one side and above said axis, said last-named point being farther away from said axis than said first-named point, whereby said cutter structures are quickly raised after the brick has been cut, and, as the cutter-reel continues on its course, thrown over ready for a succeeding operation, substantially as set forth.

4. The combination, in a brick or tile cutting machine, of a table for receiving the column of clay, a receiving-belt running around loose pulleys thereon, a cutting-table beyond said belt and below the cutting mechanism, and an off-bearing belt running below said table to a point in the rear of the cutting mechanism.

5. The combination, in a brick or tile machine, of a vertically-movable primary brick-support having a divided supporting-face, a duplex off-bearing belt, D, the members whereof are arranged between the members of said primary brick-support, separately-adjustable tightening-pulleys, $D^5$, therefor, and mechanism for adjusting said tightening-pulleys separately, substantially as shown and described.

6. The combination, in a brick or tile cutting machine, of a primary brick-support, parallel swinging arms carrying said brick-support, rock-shafts on which said swinging arms are mounted, a projecting arm also connected to one of said rock-shafts, and a cam-flange on a revolving part for operating said arm, and thus causing said primary brick-support to rise and fall with a regular motion, substantially as shown and described.

In witness whereof I have hereunto set my hand and seal, at Indianapolis, Indiana, this 14th day of August, A. D. 1895.

WILLIAM R. CUNNINGHAM. [L. S.]

Witnesses:
CHESTER BRADFORD,
JAMES A. WALSH.